(12) United States Patent
Magarelli

(10) Patent No.: US 8,885,335 B2
(45) Date of Patent: Nov. 11, 2014

(54) SERVER COOLING BY AIRFLOW THROTTLING

(71) Applicant: Marco Magarelli, Mountain View, CA (US)

(72) Inventor: Marco Magarelli, Mountain View, CA (US)

(73) Assignee: Facebook, Inc., Menlo Park, CA (US)

( * ) Notice: Subject to any disclaimer, the term of this patent is extended or adjusted under 35 U.S.C. 154(b) by 210 days.

(21) Appl. No.: 13/662,393

(22) Filed: Oct. 26, 2012

(65) Prior Publication Data

US 2014/0118924 A1    May 1, 2014

(51) Int. Cl.
*H05K 7/20*    (2006.01)
*G06F 1/20*    (2006.01)

(52) U.S. Cl.
CPC ...................... *G06F 1/206* (2013.01)
USPC ............ 361/679.47; 361/679.54; 361/679.51; 361/679.49; 361/697

(58) Field of Classification Search
CPC ....................................... G06F 1/206
USPC ........... 361/679.46–679.54, 688–723; 251/11
See application file for complete search history.

(56) References Cited

U.S. PATENT DOCUMENTS

| | | | |
|---|---|---|---|
| 6,945,058 B2 * | 9/2005 | Bash et al. ......................... 62/89 |
| 7,262,964 B1 * | 8/2007 | Barsun ........................... 361/695 |
| 7,430,118 B1 | 9/2008 | Noteboom et al. |
| 7,486,511 B1 * | 2/2009 | Griffel et al. ............. 361/679.46 |
| 7,957,142 B2 * | 6/2011 | Noteboom et al. ........... 361/696 |
| 8,248,793 B2 * | 8/2012 | Bash et al. ..................... 361/695 |
| 8,270,154 B2 * | 9/2012 | Andersen et al. ........ 361/679.47 |
| 8,270,155 B2 | 9/2012 | Tipley |
| 8,464,961 B2 * | 6/2013 | Wu et al. ....................... 236/49.3 |
| 8,467,906 B2 * | 6/2013 | Michael et al. ............... 700/276 |
| 8,488,313 B2 * | 7/2013 | Lin ............................ 361/679.5 |
| 8,605,427 B2 * | 12/2013 | Chen et al. ............... 361/679.49 |
| 2002/0108386 A1 * | 8/2002 | Spinazzola et al. ........... 62/259.2 |
| 2004/0055322 A1 * | 3/2004 | Monfarad .................... 62/259.2 |
| 2006/0168975 A1 | 8/2006 | Malone et al. |
| 2007/0089011 A1 | 4/2007 | Dodeja et al. |
| 2007/0097636 A1 * | 5/2007 | Johnson et al. ............... 361/695 |
| 2007/0213000 A1 * | 9/2007 | Day ............................... 454/184 |
| 2008/0002358 A1 * | 1/2008 | Casebolt ....................... 361/687 |
| 2008/0185446 A1 * | 8/2008 | Tozer ........................... 236/49.4 |
| 2009/0133866 A1 * | 5/2009 | Campbell et al. ............. 165/288 |
| 2009/0154104 A1 | 6/2009 | Kondo et al. |
| 2009/0168345 A1 * | 7/2009 | Martini ......................... 361/691 |
| 2009/0173473 A1 * | 7/2009 | Day ................................. 165/67 |
| 2009/0255653 A1 * | 10/2009 | Mills et al. ............... 165/104.34 |
| 2009/0302991 A1 * | 12/2009 | Neilly et al. .................. 337/315 |
| 2009/0312877 A1 * | 12/2009 | Chi-Wei et al. ............... 700/282 |

(Continued)

OTHER PUBLICATIONS

PCT International Search Report and Written Opinion, PCT Application No. PCT/US2010/057861, Jan. 20, 2011, nine pages.

*Primary Examiner* — David M Sinclair
*Assistant Examiner* — Robert Brown
(74) *Attorney, Agent, or Firm* — Fenwick & West LLP

(57) ABSTRACT

In a data center including hot and cold aisles, the flow rate of airflow from the cold aisle through servers to the hot aisle depends on the flow resistance of different servers. As servers may have different cooling needs, an airflow throttling mechanism is coupled to each server to individually adjust the flow resistance through each server based on the amount of cooling airflow needed by a server. Hence, servers use the amount of cooling airflow they need, reducing the overall airflow needs, which reduces the central fan requirements, of the data center.

23 Claims, 3 Drawing Sheets

(56) References Cited

U.S. PATENT DOCUMENTS

| | | |
|---|---|---|
| 2010/0002385 A1* | 1/2010 | Lyon et al. .................... 361/695 |
| 2010/0027216 A1* | 2/2010 | Matsushima et al. .... 361/679.49 |
| 2010/0155047 A1* | 6/2010 | Lin et al. ...................... 165/288 |
| 2010/0167636 A1* | 7/2010 | Bhattacharya et al. ....... 454/239 |
| 2010/0175851 A1* | 7/2010 | Heydari et al. .............. 165/80.2 |
| 2010/0188810 A1* | 7/2010 | Andersen et al. ........ 361/679.49 |
| 2011/0083824 A1* | 4/2011 | Rogers ......................... 165/80.2 |
| 2011/0128699 A1* | 6/2011 | Heydari et al. ........... 361/679.48 |
| 2011/0154842 A1* | 6/2011 | Heydari et al. .............. 62/259.2 |
| 2011/0184568 A1* | 7/2011 | Tai et al. ....................... 700/282 |
| 2011/0235272 A1* | 9/2011 | Bash et al. .................... 361/692 |
| 2011/0245976 A1* | 10/2011 | Thompson et al. ........... 700/275 |
| 2012/0041600 A1* | 2/2012 | Michael et al. ............... 700/276 |
| 2012/0061054 A1* | 3/2012 | Katz et al. .................... 165/80.2 |
| 2012/0068811 A1* | 3/2012 | Neilly et al. .................. 337/386 |
| 2012/0168145 A1* | 7/2012 | Peterson et al. .............. 165/287 |
| 2012/0199764 A1* | 8/2012 | Girouard ......................... 251/11 |
| 2012/0215359 A1* | 8/2012 | Michael et al. ............... 700/275 |
| 2012/0251966 A1* | 10/2012 | Yoshii et al. .................... 432/49 |
| 2012/0307440 A1* | 12/2012 | Franz et al. ................. 361/679.5 |
| 2013/0083481 A1* | 4/2013 | Goto et al. .................... 361/695 |
| 2013/0138252 A1* | 5/2013 | Chainer et al. ................ 700/282 |

* cited by examiner

SERVER COOLING BY AIRFLOW THROTTLING

BACKGROUND

This invention relates generally to efficient cooling of computing devices within a data center.

Heat removal is an important consideration in computer system and data center design. As the number of computing assets deployed in a data center increases, heat generated by electronic components in the computing assets during operation also increases. Because the reliability of computing assets used by the data center decreases if they operate at a high temperature over time, a portion of the data center's power is used for cooling electronics in the computing assets. However, as the number of computing assets included in a data center increases, a greater portion of the power consumed by the data center is used to cool electronics within the computing assets.

Conventionally, computing assets in a data center are individually equipped with cooling systems to dissipate heat produced during operation. Commonly, each server includes a fan for dissipating heat generated during operation. However, these internal fans generally consume about 10%-15% of the power used by the computing assets, and also produce heat during operation, limiting their effectiveness. Additionally, a room in the data center housing the computing assets may also be cooled using methods such as air conditioning, using additional power for cooling.

SUMMARY

Airflow through an individual server in a data center is regulated by modifying the resistance of the airflow through the individual server based on the temperature of components within the server. For example, a throttling mechanism is included in or coupled to a server and modifies the resistance of airflow through the server based on server temperature. This regulates the amount of cooling airflow passing through a server based on the amount of cooling needed by the server, which reduces the overall airflow, and central fan requirements, of the data center. In various embodiments, active or passive throttling mechanisms controlled by the temperature of components within a server are used to regulate air flow through the server.

A data center includes a cold aisle that receives cold air, where the cold aisle is connected to one side of a set of servers. A hot aisle adjacent to another side of the servers has a pressure less than the pressure of the cold aisle, causing cold air to flow from the cold aisle through the servers, cooling the electronic components in the servers while heating the air flow. In an embodiment, a cold air supply unit that is external to the cooling system, such as a fan, supplies the cold air to the cold aisle and causes the pressure difference. Additionally, the hot aisle may include one or more exhaust units that are external to the servers.

An airflow throttling mechanism is coupled to each of the servers and regulates the amount of air flowing through a server based on the temperature of one or more components within the server. For example, as the temperature of a processor in a server increases, the airflow throttling mechanism decreases the flow resistance of air travelling through the server. This increases the amount of air flowing through the server to allow the server to be more effectively cooled. If the temperature of the processor in the server decreases, the airflow throttling mechanism increases the flow resistance of air travelling through the server, reducing the amount of air flowing through the server.

In one embodiment, a sensor monitors the temperature of a server component, such as a processor or a heat sink coupled to the processor, and adjusts the airflow throttling mechanism accordingly. For example, if the temperature of the server component reaches a threshold value, the sensor communicates a control signal to the airflow throttling mechanism to increase the amount of air travelling through the server. If the temperature of the server component reaches a different threshold value, the sensor may communicate a different control signal to the airflow throttling mechanism to decrease the amount of air travelling through the server.

In one embodiment, a cooling system includes a server having an air input opening for receiving cool air and an output opening to exhaust heated air generated by the operation of the servers. Also included in the system is an air throttling element configured to control cooling airflow through the server. In some embodiments, the air throttling element is actuated by temperature, resulting in throttling, and thus, closure of airflow through the air conduction channel at low temperature, e.g., when the servers are off or in a low activity state. In some embodiments, the air throttling element includes air baffles that are able to expand in response to elevated temperature to open a ventilation flap located at the air output opening.

The figures depict various embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

Data Center Architecture Utilizing Server Airflow Throttling

Figure 1:
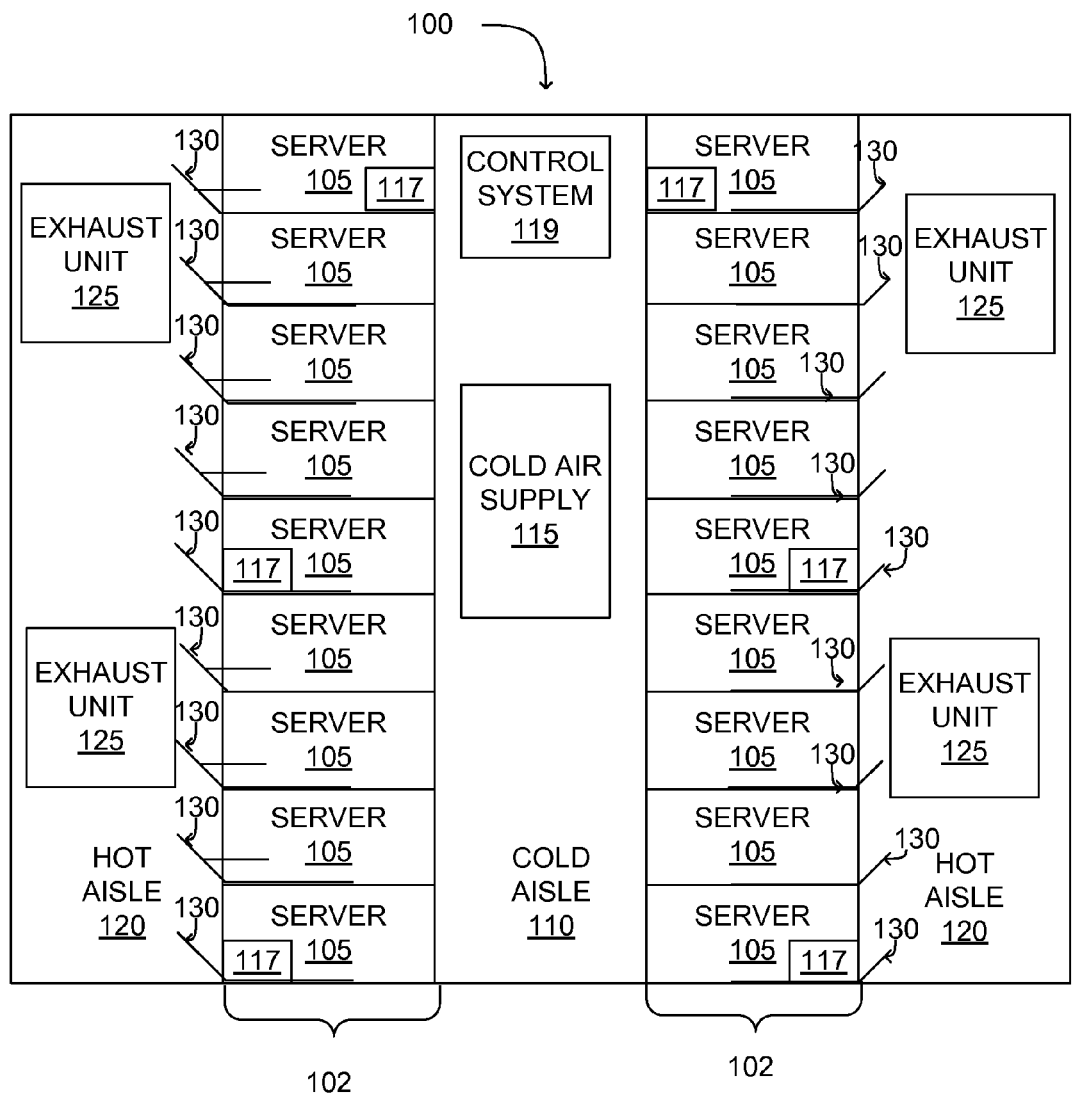
FIG. 1 is an overhead view of a data center for cooling servers without relying on internal fans in accordance with an embodiment of the invention.

An example data center 100 cooling one or more servers 105 is illustrated in FIG. 1. In one embodiment, a cold aisle 110 is adjacent to a first side of a partition 102 and a hot aisle 120 is adjacent to a second side of the partition 102. In an embodiment, the partition 102 includes one or more servers 105 oriented so that a first side of the one or more servers 105 is adjacent to the cold aisle 110 and a second side of the one or more servers 105 is adjacent to the hot aisle 120. The cold aisle 110 includes a cold air supply 115 while, in an embodiment, the hot aisle 120 includes one or more exhaust units 125. Additionally, one or more sensors 117 are proximate to a server 105, are included in the cold aisle 110, and/or are included in the hot aisle 120.

The partition 102 includes one or more openings though which air is able to flow. In an embodiment, the partition 102 comprises a rack or other structure to which one or more devices, such as one or more servers 105 or other electronic devices, may be attached. For example, the one or more servers 105 are mounted to one or more racks and may have different sizes, such as 1.5-2 rack units ("U"). The partition 102 is designed to increase airflow through the servers 105 that are included within the partition 102. For example, the partition 102 includes a server rack that is designed to increase the amount of air directed through the servers 105 included in the rack.

A server 105 has one or more input openings on a first side and one or more output openings on a second side. A server 105 is oriented so the one or more input openings are adjacent to the cold aisle 110 and the one or more output openings are adjacent to the hot aisle 120. Air from the cold aisle 110 enters the server 105 via the one or more input openings, travels through the server 105 and exits the server through the one or more output openings into the hot aisle 120. Hence, the input and output openings allow air to travel through the server 105 to cool components included in the server 105.

Cold air is supplied to the cold aisle 110 from a cold air supply 115, such as a large fan or other air distribution device. In an embodiment, the cold air supply 115 is coupled to a cooling system, further described below in conjunction with FIG. 2. As used herein, "cold air" may refer to air having a temperature less than an ambient air temperature, air having a temperature below a specified temperature, or air having a lower relative temperature than air in a different region. For example, air included in the cold aisle 110, referred to as "cold air," has a first temperature, while air included in the hot aisle 120, referred to as "hot air," has a second temperature that is higher than the first temperature. In different embodiments, the position of the cold air supply 115 relative to the cold aisle 110 may differ. For example, the cold air supply 115 may be positioned above, below, or to the side of the cold aisle 110. Additionally, in some embodiments, multiple cold air supplies 115 provide cold air to the cold aisle 110 and may have different positions relative to the cold aisle 110. For example, cold air supplies 115 are positioned above and below or below and to the side of the cold aisle 110. For purposes of illustration, FIG. 1 shows an implementation with a cold air supply 115 positioned above the cold aisle 110. As a result of the cold air supply 115, the cold aisle 110 has a higher pressure than a hot aisle 120, and this pressure difference causes cold air to flow from the higher pressure cold aisle 110 through the one or more input openings of a server 105 or the partition 102 to the lower pressure hot aisle 120.

In an embodiment, the partition 102 is configured so that air flow paths external to the servers 105 are substantially blocked such that the airflow path of least resistance from the cold aisle 110 to the hot aisle 120 is through the servers 105. Configuring the partition 102 so that the airflow path of least resistance is through the servers 105 allows more efficient server 105 cooling by increasing the amount of air passing through the servers 105. In another embodiment, the partition 102 blocks substantially all airflow from the cold aisle 110 to the hot aisle 120 except for the airflow through the servers 105, so that substantially all of the airflow from the cold aisle 110 to the hot aisle 120 is through the servers 105. To facilitate airflow from the cold aisle 110 to the hot aisle, in one embodiment the cold aisle 110 may be pressurized while the hot aisle 120 is depressurized to facilitate airflow from the cold aisle 110 to the hot aisle 120. As the cold air passes through the server 105, it flows over components within the server 105, dissipating heat generated from operation of the electric components in the servers 105.

An airflow throttling mechanism 130 is coupled to each of the one or more servers 105 and regulates the amount of air flowing through the server 105 based on the temperature of one or more components within the server 105. For example, as the temperature of a processor in a server increases, the airflow throttling mechanism 130 decreases the flow resistance of air travelling through the server 105. This increases the amount of air flowing through the server 105 to increase cooling of components in the server 105. If the temperature of the processor, or of another component in the server 105, decreases, the airflow throttling mechanism 130 increases the flow resistance of air travelling through the server 105 to reduce the amount of air flowing through the server 105.

For example, the airflow throttling mechanism 130 comprises a ventilation flap coupled to a thermodynamically actuated baffle coupled to a component included in the server. For example, the thermodynamically actuated baffle is coupled to a processor or to a heat sink of a processor included in the sever 105. As the temperature of the component increases, the ventilation flap is repositioned to increase the amount of air flowing out of an output opening of the server 105. For example, the thermodynamically actuated baffle expands as the temperature of the component increases, moving the ventilation flap from a closed position blocking the output opening of the server 105 to an open position. Similarly, as the temperature of the component decreases, the thermodynamically actuated baffle contracts, moving the ventilation flap from an open position to a closed position blocking air from flowing out of the server 105 via the output opening. Alternatively, the ventilation flap may be positioned to block air from flowing into the server 105 via an input opening or to allow air to flow into the server 105 via the input opening based on the temperature of the component coupled to the thermodynamically actuated baffle, as described above.

In different embodiments, the cold air supply 115 may statically or dynamically control the amount of air supplied to the cold aisle 110 to modify the airflow through the servers 105. In an embodiment where the air supply is statically controlled, the cold air supply 115 is louver-based and supplies cold air in different directions, at different flow rates, and/or at different temperature levels. In an alternative embodiment, the cold air supply 115 dynamically modifies the airflow supplied to the cold aisle 110 by changing the speed of one or more supply fans, repositioning one or more air supply louvers (or otherwise redirecting the airflow), or changing the temperature to which the airflow is cooled. Modifying the supply fan speed, supply louver position, and/or air temperature allows the cold air supply 115 to more suitably cool the servers 105 included in the partition 102. Hence, implementations of the cold air supply 115 allow non-uniform air flow and/or air temperature throughout the cold aisle 110, enabling different locations within the cold aisle 110, such as locations proximate to different servers 105, to have a different air flow rate and/or a different air temperature. Additionally, the air flow from the cold air supply 115 may be determined or modified based on the size of the servers 105 being cooled.

After flowing through the servers 105, cold air enters the hot aisle 120 because it has a lower pressure than the cold aisle 110. Because the air extracts heat from components within one or more servers 105, when passing from the cold aisle 110 to the hot aisle 120, the air temperature increases so that air in the hot aisle 120 has a higher temperature than air in the cold aisle 110. In an embodiment, the hot aisle 120 includes one or more exhaust units 125, such as exhaust fans, which extract air from the hot aisle 120. While FIG. 1 shows an example hot aisle 120 with two exhaust units 125, in other embodiments, the hot aisle may include a different number of exhaust units 125. In an embodiment, the exhaust unit 125 is coupled to a cooling system, further described below in conjunction with FIG. 2, so that air flows from the hot aisle 120 into the one or more exhaust units 125 and into the cooling system, where it is cooled and recirculated into the cold aisle 110 via the cold air supply 115. Alternatively, cold air enters the hot aisle 120 and is directed outside of the data center 100.

The data center 100 also includes one or more sensors 117 in locations where air flows from the cold aisle 110 to the hot aisle 120. The sensors 117 monitor air flow, air temperature, air humidity, absolute air pressure, differential air pressure, or any other data that describes air flow or air temperature, and combinations thereof. In an embodiment, the sensors 117 are placed in locations where airflow is likely to be less than other locations, such as a ceiling or a wall where the partition 102 abuts another surface, so that the temperature of the sensor locations is likely to be higher than other locations. For example, sensors 117 are placed in corners of the cold aisle 110 to monitor airflow through the corners, the temperature of the corners, the pressure difference between the cold aisle 110 and the hot aisle 120 or another value characterizing air flow through the sensor location. In another embodiment, sensors 117 are positioned at locations within the cold aisle 110, at locations within the hot aisle 120, at locations within one or more servers 105 or in any combination of the above-described locations.

The sensors 117 communicate with a control system 119 coupled to, or included in, the cooling system and/or the cold air supply 115 to modify how air is cooled by the cooling system or how cold air is supplied to the cold aisle 110 by the cold air supply 115. The control system 119 generates a control signal responsive to data from one or more sensors 117 to modify operation of the cooling system and/or the cold air supply 115. For example, responsive to detecting a temperature reaching a threshold value, an air flow reaching a threshold flow rate, or a pressure difference between the cold aisle 110 and the hot aisle 120 falling below a threshold value, a sensor 117 communicates with the control system 119, which generates a control signal increasing the rate at which the cold air supply 115 supplied to the cold aisle 110 or modifying the direction in which cold air is supplied to the cold aisle 110 by the cold air supply 115. Hence, the sensors 117 and control system 119 implement a feedback loop allowing the data center 100 to modify how cold air flows through the servers 105 responsive to changes in the data center environment, improving the cooling efficiency.

Figure 2:
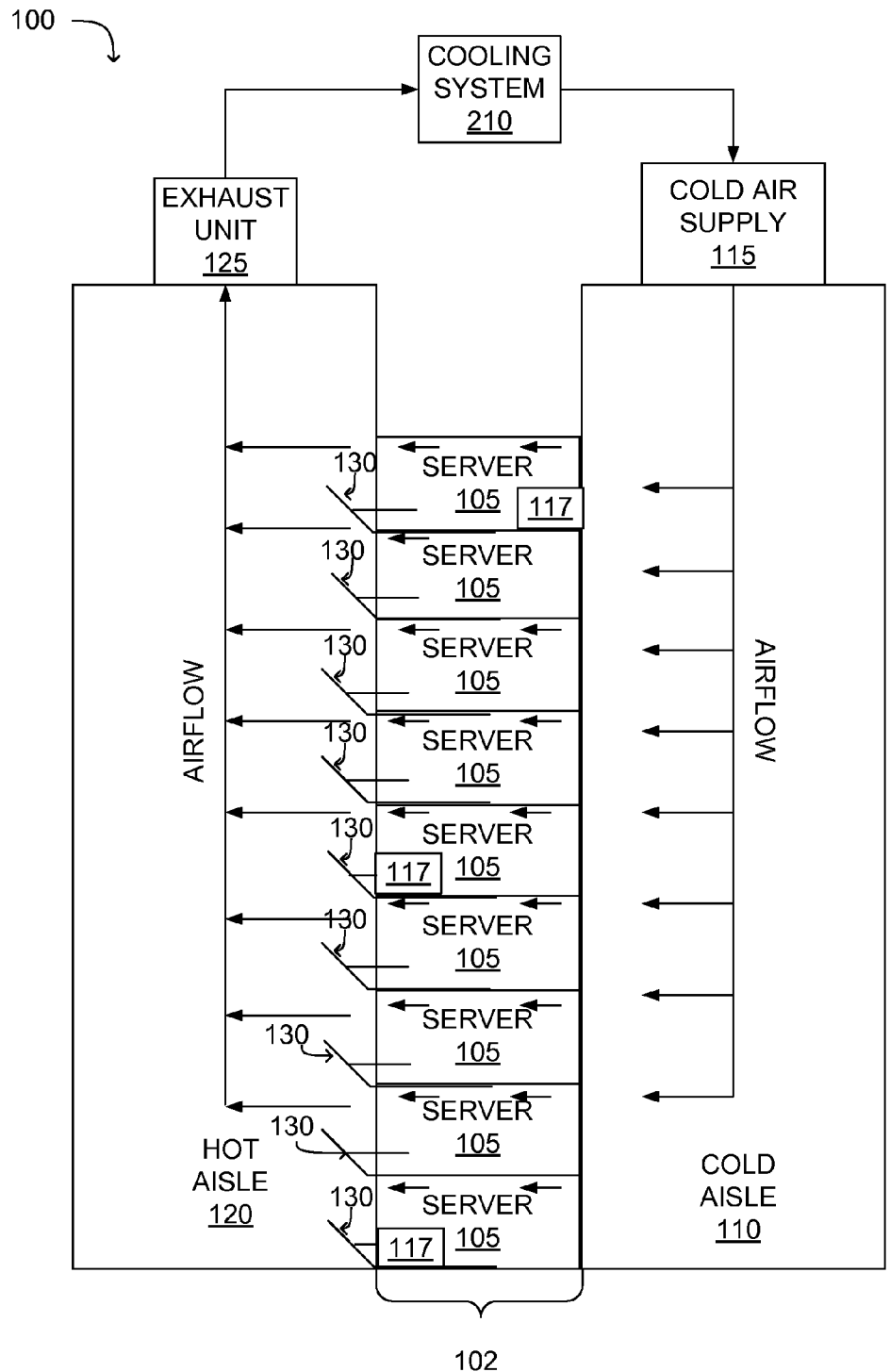
FIG. 2 is a side view of a data center for cooling servers without relying on internal fans showing airflow throughout the data center in accordance with an embodiment of the invention.

FIG. 2 is a side view of the airflow in data center 100 that is capable of cooling the servers 105 without depending on fans within the servers 105, according to one embodiment. The arrows indicate the flow of air throughout the data center 100. As illustrated, a cooling system 210 is coupled to a cold air supply 115 and to an exhaust unit 125. While FIG. 2 shows a single cold air supply 115 and a single exhaust unit 125, other embodiments may have multiple cold air supplies 115 and/or multiple exhaust units 125.

The cooling system 210 comprises a Heating, Ventilating and Air Conditioning ("HVAC") system, which extracts heat from air. For example, the cooling system 210 uses free-air cooling, such as air-side or liquid-side economization to cool the air. In an embodiment, the cooling system 210 includes secondary cooling systems, such as an evaporative cooling system, an absorption cooling system, an adsorption cooling system, a vapor-compression cooling system, or another cooling system to extract heat from air. In another embodiment, the cooling system 210 also modifies the humidity of the cool air to improve reliability and/or longevity of the servers 105 being cooled. For example, the cooling system 210 produces cold air having a humidity within a specified range, such as 20% to 60% humidity, to the cold aisle 110.

In one embodiment, the cooling system 210 receives heat from the exhaust units 125 included in the hot aisle 120, cools and dehumidifies the received air, and supplies the cooled and dehumidified air to the cold air supply 115, where it is supplied to the cold aisle 110. In this embodiment, the cooling system 210 is a closed system, which recirculates air from the hot aisle 120 to the cold aisle 110 once the air is cooled and dehumidified. As illustrated by the arrows in FIG. 2, the cooled air travels from the cooling system 210 to the cold air supply 115, which supplies the cold air to the cold aisle 110. In an embodiment, the cold air supply 115 comprises one or more fans or one or more air nozzles, one or more air jets, or other device for directing air flow.

Cooled air from the cold air supply 115 enters the cold aisle 110. Because the cold aisle 110 has a higher pressure than the hot aisle 120, and the partition 102 includes one or more openings for air flow, the cold air flows from the cold aisle 110 to the lower pressure hot aisle 120. To flow from the cold aisle 110 to the hot aisle 120, the cold air passes through the openings in the partition 102, so that the cold air is drawn through the partition 102. In an embodiment, the partition 102 includes one or more servers 105 that have one or more input openings on a first side adjacent to the cold aisle 110 and one or more output openings on a second side adjacent to the hot aisle 120. The input openings allow cold air to enter the server 105, travel through the server 105, flowing over components within the server 105. After traveling through the server 105, the output openings enable air to exit the server 105 into the hot aisle 120.

As described above in conjunction with FIG. 1, an airflow throttling mechanism 130 may be coupled to each of the one or more servers 105. An airflow throttling mechanism 130 regulates the resistance to air flow through a server 105 coupled to the airflow throttling mechanism 130 based on the temperature of one or more components within the server 105. For example, as the temperature of a processor in a server 105 increases, the airflow throttling mechanism 130 decreases the flow resistance of air travelling through the server 105, allowing more air to travel through the server 105. For example, the airflow throttling mechanism 130 removes an obstruction from an input opening of the server 105 or from an output opening of the server 105 to increase air flow through the server 105. As another example, the airflow throttling mechanism 130 obstructs, or partially obstructs, the input opening or the output opening of the server 105 when the temperature of a component in the server 105 decreases or reaches a minimum value. Obstructing the input opening or the output opening reduces the air flow through the server 105 by increasing the resistance to air flow. Examples of an airflow throttling mechanism 130 are further described below in conjunction with FIGS. 3A and 3B.

As cool air travels through the partition 102 and/or a server 105 from the cold aisle 110 to the hot aisle 120, a portion of the air travels across, or through, one or more sensors 117 which monitor attributes of the airflow, such as air temperature, air humidity, absolute air pressure of the cold aisle 110 or of the hot aisle 120, or a pressure difference between the cold aisle 110 and the hot aisle 120. The sensors 117 communicate the monitored attributes to a control system, which is coupled to or included in, the cold air supply 115 or the cooling system 210. The control system generates a control signal modifying operation of the cold air supply 115 and/or the cooling system 210 to modify the cold air supplied to the cold aisle 110. For example, responsive to a sensor 117 detecting a temperature above a threshold value, an air flow below a threshold flow rate or a pressure difference between the cold aisle 110 and the hot aisle 120 falling below a threshold value, the control system generates a control signal increasing the rate or direction at which the cold air supply 115 supplies cold air to the cold aisle 110 or generates a control signal directing cold air from the cold air supply 115 towards certain areas in the cold aisle 110 needing increased cooling. For example, the control signal causes the cold air supply 115 to move cold air towards a region of the partition 102 where a sensor 117 indicates a temperature above a threshold value or an airflow rate below a threshold value. Alternatively, the control system generates a control signal causing the cooling system 210 to further reduce the temperature of the air provided to the cold aisle 110.

One or more exhaust units 125 are included in the hot aisle 120 to extract air from the hot aisle 120 and to direct air from the hot aisle 120 to the cooling system 210, where the air is again cooled. Hence, the one or more exhaust units 125 implement a closed-loop where air is cooled by the cooling system 210 and recirculated to the cold aisle 110 via the cold air supply 115. Because the pressure differential between cold aisle 110 and hot aisle 120 causes air to flow through the partition 102, and electronic devices included in the partition 102, electronic devices included in the data center 100 are cooled without relying on air moving devices, such as fans, operating at individual electronic devices. Additionally, reducing the use of locally-implemented air moving devices reduces power consumption of the electronic devices, making the data center 100 more power efficient.

Server Airflow Throttling System

Figure 3A:
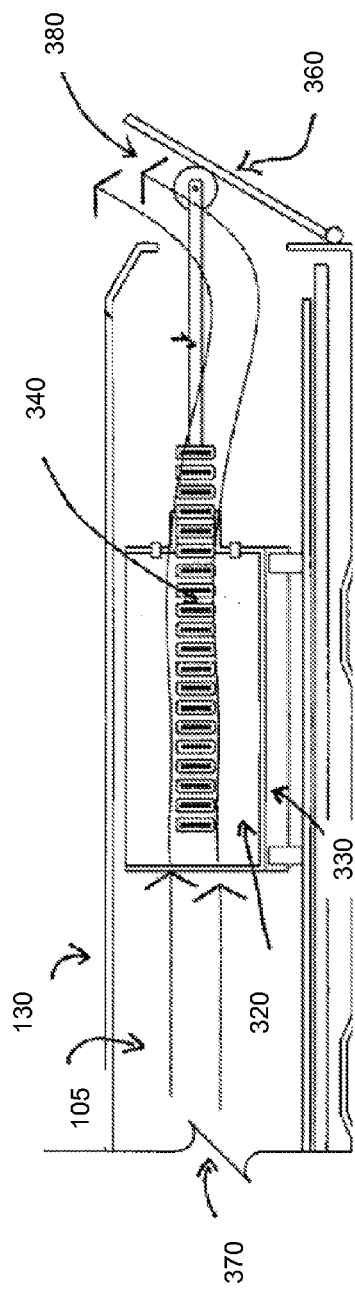
FIG. 3A is side view of an airflow throttling mechanism for regulating airflow through a server in an open state in accordance with an embodiment of the invention.
Figure 3B:
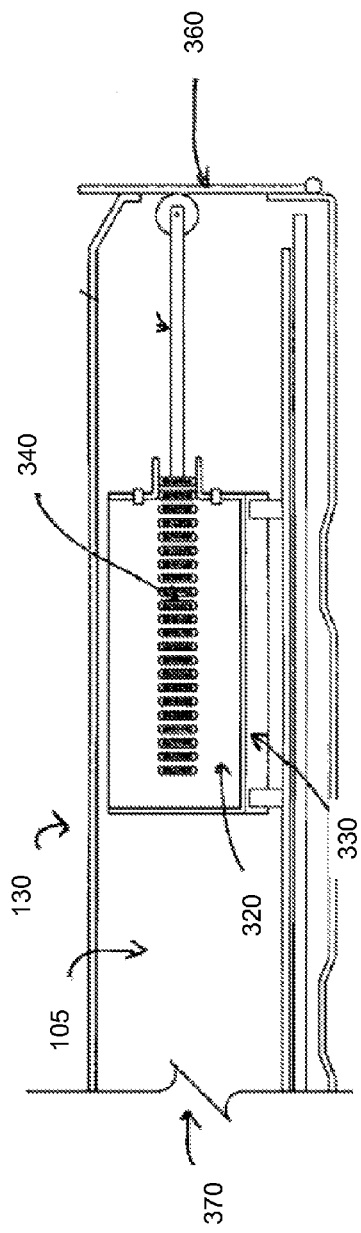
FIG. 3B is side view of an airflow throttling mechanism for regulating airflow through a server in a closed state in accordance with an embodiment of the invention.

An example airflow throttling mechanism 130 is shown in FIGS. 3A and 3B. FIG. 3A shows the airflow throttling mechanism 130 in an "open" state, while FIG. 3B shows the airflow throttling mechanism 130 in a "closed" state. As shown in FIGS. 3A and 3B, cool air enters an input 370 of the airflow throttling mechanism 130, which may be aligned with an input of a server 105 coupled to the airflow throttling mechanism 130 or included in the airflow throttling mechanism 130. A processor 330 is included in the server 105, and a heat sink 320 is coupled to the processor 330. The heat sink 320 collects heat generated during processor operation. In the example of FIGS. 3A and 3B, the airflow throttling mechanism 130 includes a thermodynamically actuated baffle 340 coupled to a ventilation flap 360.

When the server 105 is operating, the processor 330 generates heat that is transferred to the heat sink 320. The thermodynamically actuated baffle 340 may expand as the heat sink 320 increases in temperature, which moves the ventilation flap 360 to an "open" position away from an output opening 380 of the server 105 or of the airflow throttling mechanism 130 as shown in FIG. 3A. While the ventilation flap 360 is in the open position, air may freely flow from the input 370 of the airflow throttling mechanism 130, through the server 105 and out of the other end the server 105 and airflow throttling mechanism 130 via the output opening 380, drawing heat away from the processor 330. The air flow is depicted by the arrows in FIG. 3A.

When the processor 330 is off or in a low activity state, as shown in FIG. 3B, less heat is generated and absorbed by the heat sink 320. The lower heat sink temperature causes the thermodynamically actuated baffle 340 to contract, moving the ventilation flap 360 to a "closed" state blocking the output opening 380. Hence, the closed state of the ventilation flap 360 prevents air from flowing through the server 105 and exiting through the output opening 380. Hence, the airflow throttling mechanism 130 regulates air flow through a server 105 based on the temperature of components in the server 105, increasing or decreasing the air flow depending on the need to cool components in the server 105.

For example, when the heat sink 320 reaches a maximum temperature, the thermodynamically actuated baffle 340 expands and positions the ventilation flap 360 in the open state to cool the processor 330. When the heat sink 320 reaches a minimum temperature, the thermodynamically actuated baffle 340 contracts and positions the ventilation flap 340 in the closed state to prevent air from flowing through the server 105. Alternatively, the thermodynamically actuated baffle 340 dynamically repositions the ventilation flap 360 as the heat sink temperature changes, allowing the ventilation flap 360 have a range of positions based on the heat sink 320 temperature.

While FIGS. 3A and 3B show a passive airflow throttling mechanism 130 using expansion and contraction of a thermodynamically actuated baffle 340 to modify air flow through the server 150, in other embodiments the airflow throttling mechanism 130 may use active components to reposition the ventilation flap 360 or otherwise block the input 370 or output 380 of the airflow throttling mechanism 130 and/or of the server 105. For example, a sensor measures the temperature of the heat sink 320 and generates a control signal for a servo motor, which repositions the ventilation flap 360 based on the control signal.

Summary

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a tangible computer readable storage medium, which include any type of tangible media suitable for storing electronic instructions, and coupled to a computer system bus. Furthermore, any computing systems referred to in the specification may include a single processor or may be architectures employing multiple processor designs for increased computing capability.

Embodiments of the invention may also relate to a computer data signal embodied in a carrier wave, where the computer data signal includes any embodiment of a computer program product or other data combination described herein. The computer data signal is a product that is presented in a tangible medium or carrier wave and modulated or otherwise encoded in the carrier wave, which is tangible, and transmitted according to any suitable transmission method.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A data center system comprising:
   a partition arranged between a cold aisle on a first side of the partition and a hot aisle on a second side of the partition;
   a server arranged in the partition so that the server has an input opening positioned on the first side of the partition in communication with the cold aisle and an output opening on the second side of the partition in communication with the hot aisle, wherein the partition is arranged so that an airflow path of least resistance from the cold aisle to the hot aisle is through the server;
   an airflow throttling mechanism coupled to the server and configured to modify a resistance of the airflow path of least resistance from the cold aisle to the hot aisle based on a temperature of a component of the server, and
   an air supply unit, located external to the plurality of servers, configured to pressurize the cold aisle relative to the hot aisle, so that air flows from the cold aisle to the hot aisle through the server, wherein the airflow throttling mechanism comprises a ventilation flap coupled to a thermodynamically actuated baffle coupled to a heat sink of a processor included in the server.

2. The data center system of claim 1, wherein the ventilation flap decreases the resistance of the airflow path as a temperature of the heat sink of the processor increases.

3. The data center system of claim 1, wherein the ventilation flap increases the resistance of the airflow path as a temperature of the heat sink of the processor decreases.

4. The data center system of claim 1, wherein the airflow throttling mechanism comprises one or more baffles having a size dependent on the temperature of the component of the server.

5. The data center system of claim 4, wherein a baffle contracts to increase the flow resistance of the airflow path as the temperature of the component of the server decreases.

6. The data center system of claim 5, wherein the baffle moves a ventilation flap to increase the flow resistance of the airflow path when it contracts.

7. The data center system of claim 4, wherein a baffle expands to decrease the flow resistance of the airflow path as the temperature of the component of the server increases.

8. The data center system of claim 5, wherein the baffle moves a ventilation flap to decrease the flow resistance of the airflow path when it expands.

9. The data center system of claim 1, further comprising one or more sensors coupled to a control system coupled to the air supply unit, the one or more sensors for monitoring an attribute of airflow through locations including the one or more sensors and the control system for generating a control signal modifying air supplied to the cold aisle by the air supply unit responsive to the attribute.

10. The data center system of claim 9, where the attribute of airflow through the locations is at least one of an airflow rate, a temperature, a pressure difference between the cold aisle and the hot aisle.

11. The data center system of claim 9, wherein the one or more sensors are positioned at locations along the partition.

12. A system comprising:
    a server configured so air flows from an input opening on a first side of the server through the server and exits the server through an output opening on a second side of the server; and
    an air flow throttling mechanism coupled with one or more components within the server, the air flow throttling mechanism configured to regulate an amount of air flowing through the server based on a temperature of the one or more components within the server, wherein the airflow throttling mechanism comprises a ventilation flap coupled to a thermodynamically actuated baffle coupled to a heat sink of a processor included in the server.

13. The system of claim 12, wherein the ventilation flap is moved by the thermodynamically actuated baffle to increase the amount of air flowing through the server as a temperature of the heat sink of the processor increases.

14. The system of claim 12, wherein the ventilation flap is moved by the thermodynamically actuated baffle to decrease the amount of air flowing through the server as a temperature of the heat sink of the processor decreases.

15. The system of claim 12, wherein the airflow throttling mechanism comprises one or more baffles having a size dependent on the temperature of the component within the server.

16. The system of claim 15, wherein a baffle expands as the temperature of the component within the server increases and a ventilation flap is moved to increase an amount of air exiting the server through the output opening when the baffle expands.

17. The system of claim 15, wherein a baffle contracts as the temperature of the component within the server decreases and a ventilation flap is moved to decrease an amount of air exiting the server through the output opening when the baffle contracts.

18. The system of claim 12, wherein the airflow throttling mechanism comprises a ventilation flap coupled to a servo motor receiving a control signal from a sensor coupled to a component included in the server and configured to reposition the ventilation flap based on the control signal, the control signal based on a temperature of the component.

19. A method, comprising:
    arranging a partition between a cold aisle on a first side of the partition and a hot aisle on a second side of the partition such that an airflow path of least resistance from the cold aisle to the hot aisle is through a server;
    arranging the server in the partition so that the server has an input opening positioned on the first side of the partition in communication with the cold aisle and an output opening on the second side of the partition in communication with the hot aisle;
    coupling an airflow throttling mechanism to the server, the airflow throttling mechanism configured to modify a resistance of the airflow path of least resistance from the cold aisle to the hot aisle based on a temperature of a component of the server, and configuring an air supply unit external to the plurality of servers to pressurize the cold aisle relative to the hot aisle, so that air flows from the cold aisle to the hot aisle through the server, the airflow throttling mechanism comprising a ventilation flap coupled to a thermodynamically actuated baffle coupled to a heat sink of a processor included in the server.

20. The method of claim 19, wherein the ventilation flap decreases the resistance of the airflow path as a temperature of the heat sink of the processor increases.

21. The method of claim 19, wherein the ventilation flap increases the resistance of the airflow path as a temperature of the heat sink of the processor decreases.

22. The method of claim 19, further comprising:
coupling one or more sensors to a control system coupled to the air supply unit, the one or more sensors monitoring an attribute of airflow through locations including the one or more sensors and the control system for generating a control signal modifying air supplied to the cold aisle by the air supply unit responsive to the attribute.

23. The method of claim 22, where the attribute of airflow through the locations is at least one of an airflow rate, a temperature, a pressure difference between the cold aisle and the hot aisle.

* * * * *